Figure 1:
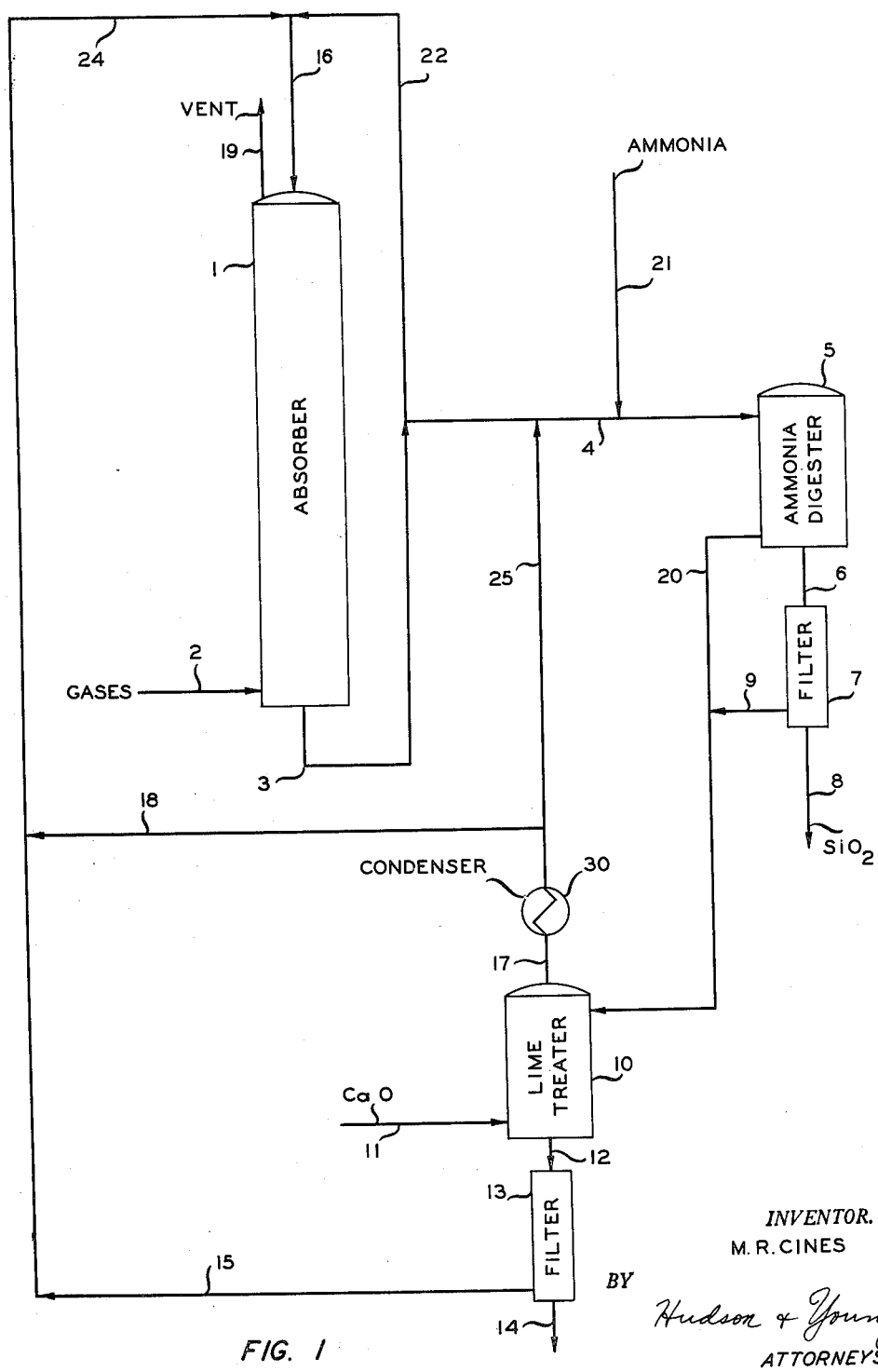

3,024,086
DISPOSAL OF FLUORINE WASTES
Martin R. Cines, Bartlesville, Okla., assignor to Phillips Petroleum Company, a corporation of Delaware
Filed June 15, 1959, Ser. No. 820,353
6 Claims. (Cl. 23—88)

This invention is directed to a process for the disposal of acidic fluorine compounds by chemical means. More specifically it is directed to a process for converting into a form which can be economically and safely disposed of, the acidic fluorine compounds liberated as gases in the conversion of phosphate rock to phosphatic fertilizer. This application is a continuation-in-part of my copending application Serial No. 605,637, filed August 22, 1956, now abandoned, which is a continuation-in-part of application Serial No. 433,201, filed May 28, 1954, now abandoned.

The manufacture of phosphatic fertilizer by conventional methods employs phosphoric acid as one of the principal reactants. For example, in producing triple superphosphate (monocalcium phosphate), concentrated phosphoric acid is reacted with phosphate rock. In the production of ammonium phosphates broadly, phosphoric acid reacts with ammonia to form mono, di, and tri-ammonium phosphate, the composition depending principally on acid concentration and temperature. For example, in the production of ammophos (monoammonium phosphate) dilute phosphoric acid is neutralized with ammonia and the resulting salt separated from the mother liquor by crystallization. The phosphoric acid used in these processes is generally prepared by the wet method, that is, the treatment of phosphate rock with sufficient sulfuric acid to convert the $P_2O_5$ content into a weak phosphoric acid, the gypsum formed in the reaction being separated from the acid by filtration. A substantial amount of fluorine is present in the phosphate rock, which is primarily fluorapatite $Ca_4(CaF)(PO_4)_3$ and in the acid treatment a considerable proportion of the fluorine is driven off, the amount varying directly with the strength of the acid. For practical purposes the fluorine may be considered combined as calcium fluoride and the first and main reaction between this and the sulfuric acid results in the formation of hydrofluoric acid and calcium sulfate (gypsum).

(1) 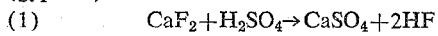
$$CaF_2 + H_2SO_4 \rightarrow CaSO_4 + 2HF$$

Most of the HF acts upon the silica present in the rock as silicates (for example, clay) to form silicon tetrafluoride and water:

(2) 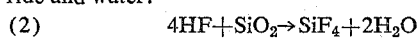
$$4HF + SiO_2 \rightarrow SiF_4 + 2H_2O$$

The $SiF_4$ which is a gas is decomposed by the water present with the formation of silicic acid and fluosilicic acid, thus:

(3) 
$$3SiF_4 + 4H_2O \rightarrow Si(OH)_4 + 2H_2SiF_6$$

Before this last reaction takes place, however, a considerable amount of silicon tetrafluoride escapes as a gas. The fluosilicic acid also decomposes to silicon tetrafluoride and hydrofluoric acid:

(4) 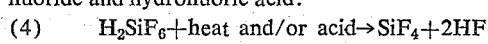
$$H_2SiF_6 + \text{heat and/or acid} \rightarrow SiF_4 + 2HF$$

This occurs whenever sulfuric acid is added or at high temperature and especially when any air is blown into the solution. It also occurs if the phosphoric acid is concentrated by evaporation, as it is when used in the manufacture of triple superphosphate from phosphoric acid and phosphate rock. This reaction also takes place when wet-process phosphoric acid is neutralized with ammonia in the precipitation of ammophos; i.e., the heat of neutralization decomposes fluosilicic acid impurities in the phosphoric acid.

Because these gaseous fluorine compounds are a menace to the health of personnel, injurious to vegetation, and a pronounced menace to the surrounding communities, it is necessary to collect these gases. In the past this has usually been done by passing the fumes through aqueous spray towers to recover fluosilicic acid and to precipitate the silica content according to reaction 3 above.

As there is no market for the large amounts of fluosilicic acid formed in a commercial operation and amounting to several tons per day in a superphosphate plant, the usual practice has been to treat the acid with an alkali or alkali earth metal salt to precipitate an insoluble fluosilicate which can be disposed of.

The aforesaid method is objectionable for several reasons. First, considerable fouling of the absorption or spray tower can result due to the formation of insoluble silicic acid. Second, the scrubber liquid begins to fume heavily when a solution of 10 percent mixed fluoro acids is attained and hence must be pressurized to attain a higher acid concentration. Third, the fluosilicates of the less expensive bases are not stable compounds and therefore not easily disposed of. Fluosilicic acid is unusual in that its sodium, potassium, and barium salts have low solubility while calcium, lead, zinc, and other salts are readily soluble. From an economic view, it is not always desirable to precipitate the fluosilicic acid in the form of sodium, potassium, or barium salts. Not only are the starting materials too expensive in the quantities required in a superphosphate plant, but some, e.g., brine, liberate new acids (HCl in this case), which also have to be neutralized, thus requiring additional base. The calcium salt is the cheapest to prepare but since it is relatively soluble in cold water, it cannot be disposed of in places where it will find its way into fresh water streams or other sources of water supply.

It is, therefore, an object of the present invention to provide an improved method for the disposal of acidic fluorine compounds.

A further object is the provision of an improved method for the removal of fluoro acid-forming fumes from industrial waste gases in a form which can be safely disposed of.

Another object is to provide a method for more efficient disposal of fluosilicic acid-forming gases evolved during the formation of phosphoric acid from phosphate rock.

A more specific object of the invention is to provide a method for converting to a water-insoluble form the hydrofluoric acid and silicon tetrafluoride fumes from a phosphatic fertilizer plant.

In accordance with the present invention obnoxious fluorine-containing fumes, such as the fluosilicic acid-forming fumes from a triple superphosphate fertilizer plant, are absorbed mostly as fluosilicic acid ($H_2SiF_6$) in a solution of fluo-ammonium salts; the absorbed fumes are then neutralized by aqueous ammonia to form ammonium fluoride, $NH_4F$, and ammonium fluosilicate, $(NH_4)_2SiF_6$, thereby suppressing the fuming of the fluosilicic acid. The ammonium fluosilicate solution is then decomposed by digestion in concentrated ammonia, precipitating silica and liberating additional ammonium fluoride. The total ammonium fluoride product from the two reactions is reacted with lime to form the insoluble calcium fluoride. The liberated ammonia can be recovered and reused in the process. Calcium fluoride is a stable precipitate in water.

In carrying out the invention in a preferred embodiment thereof the acidic gases are introduced to an absorption zone wherein they are contacted in countercurrent flow with an aqueous solution of ammonium fluoride, ammonium fluosilicate and ammonia. This solution is obtained by recycling absorber bottoms to the top of the absorber and adding thereto ammonia or ammonium solution. As the acidic gases pass upwardly through the absorber, the fluorine compounds react to form soluble ammonium fluoride and ammonium fluosilicate. In order to prevent the formation of the insoluble orthosilicic acid, $Si(OH)_4$, which might foul the absorber, it is necessary that the amount of ammonia in the absorbent liquid be substantially equal to the stoichiometric quantity required to neutralize the acidic gases to the soluble salts.

The quantity of the ammonia in the absorber can be controlled broadly to provide an effluent ranging between about pH 4 and a free ammonia content (ammonia unreacted with acidic gases) of about five percent by weight. Usually it is desirable to maintain the effluent either neutral, that is about pH 7, or basic. One consideration is the selection of materials of construction; which can differ substantially, depending on whether the system is acidic or basic. Preferably the concentration of ammonia in the effluent is maintained between about 0.1 and about 2 percent unreacted ammonia.

In addition to the quantity of ammonia employed, another important factor in the prevention of solids formation during neutralization of the acidic gases is the maximum concentration of ammonia in the absorber. It has been found that if neutralization is carried out in a dilute solution of ammonia, orthosilicic acid is not formed, whereas more concentrated ammonia serves to carry the reaction beyond the formation of the soluble salts. Usually the maximum ammonia concentration in the absorber is maintained between about 0.01 and about 5 percent by weight and preferably between about 0.05 and about 1.0 percent by weight. By the use of dilute ammonia solutions it is possible to regulate the amount of ammonia which contacts the acidic gases in any portion of the absorption zone.

In the operation of the ammonia digester, wherein ammonium fluosilicate is converted to ammonium fluoride and orthosilicic acid, an important consideration is the quantity of ammonia present. The stoichiometric quantity of ammonia required for this conversion is 4 mols of ammonia per mol of fluosilicic acid. This, however, is the minimum quantity of ammonia required and usually it is desirable to maintain some excess, for example, between about 0.1 and about 1 mol of ammonia per mol of fluosilicic acid entering the digester. The concentration of ammonia in the digester can be of the same order of magnitude as in the absorber or if desired a more concentrated ammonia solution can be provided, for example, as high as 20 to 30 percent of ammonia by weight or higher.

When operating with the dilute ammonia solutions which are required in the absorption zone, large quantities of water remain after the ammonia is consumed in the neutralization reactions. In the method of this invention, the handling and recovery problems which would normally result from this large volume of water are minimized by returning a portion of the absorber effluent to the top of the absorber thereby building up a recycle stream large in proportion to the absorber yield. The ammonia required for neutralization is introduced to the recycle stream and the combined streams enter the absorber together. By operating in this manner it is possible to provide ammonia makeup to the absorber in a concentrated form and yet obtain the desired dilute ammonia solution therein. Usually the absorber is operated with a recycle ratio of between about 5 and about 15:1; however, recycle rates as low as 1:1 and as high as 50:1 can be used. The concentration of the ammonia combined with the recycle stream is regulated according to the recycle ratio to provide the desired ammonia solution in the absorber.

The absorption and digestion steps are usually carried out at atmospheric pressure; however, elevated pressures can be used if desired. Elevated temperatures promote the digestion process, therefore, it is preferred to operate this stage of the process at or near the boiling point of water, although lower temperatures, for example, as low as 100° F. to 150° F., can be used. The absorption temperature is governed by the limitations of the processing equipment and by the temperatures of the various streams entering the absorber. Usually absorption is carried out in a temperature range of between about 100° F. and about 200° F.

The reaction which takes place in the lime treater is exothermic, therefore, the temperatures in this step usually are as great as or greater than the temperature at which digestion is carried out. Elevated temperatures are preferred in the lime treating step since it is economically desirable to recover ammonia from the lime treater.

It is within the scope of the invention to carry out digestion and lime treating either separately or as a single operation. Advantages and disadvantages are present in either type of process arrangement. The use of separate digestion and lime treating entails recovery of silica from the digestion operation, which involves a difficult separation procedure. Separate digestion and lime treating are advantageous in that extended digestion time can be provided whereby substantially complete precipitation of silica is obtained, thus enabling substantially complete conversion of the fluorine to calcium fluoride in the lime treating operation. However, when the two operations are carried out in the same vessel, or zone, although 100 percent conversion to calcium fluoride is not obtained, a readily disposable solid residue can be obtained by providing an excess of calcium oxide in the operation. More usually when operating with combined digestion and lime treating, it is desirable that the solids discharged from the process contain from about 2 to about 8 percent of excess lime.

The aforedescribed process provides a method for converting the fluorine content of off-gases to a single, easily disposable form which is sufficiently insoluble to be disposed of by burial without serious aftercontamination of ground water by pollution with poisonous fluorine compound. The water solubility of calcium fluoride is so low that it releases less fluoride in terms of parts per million of fluoride to water, than that present in many natural waters.

This eliminates the formation and handling of fuming fluosilicic acid and the subsequent problem of economically converting this acid to a readily disposable salt.

Figure 2:
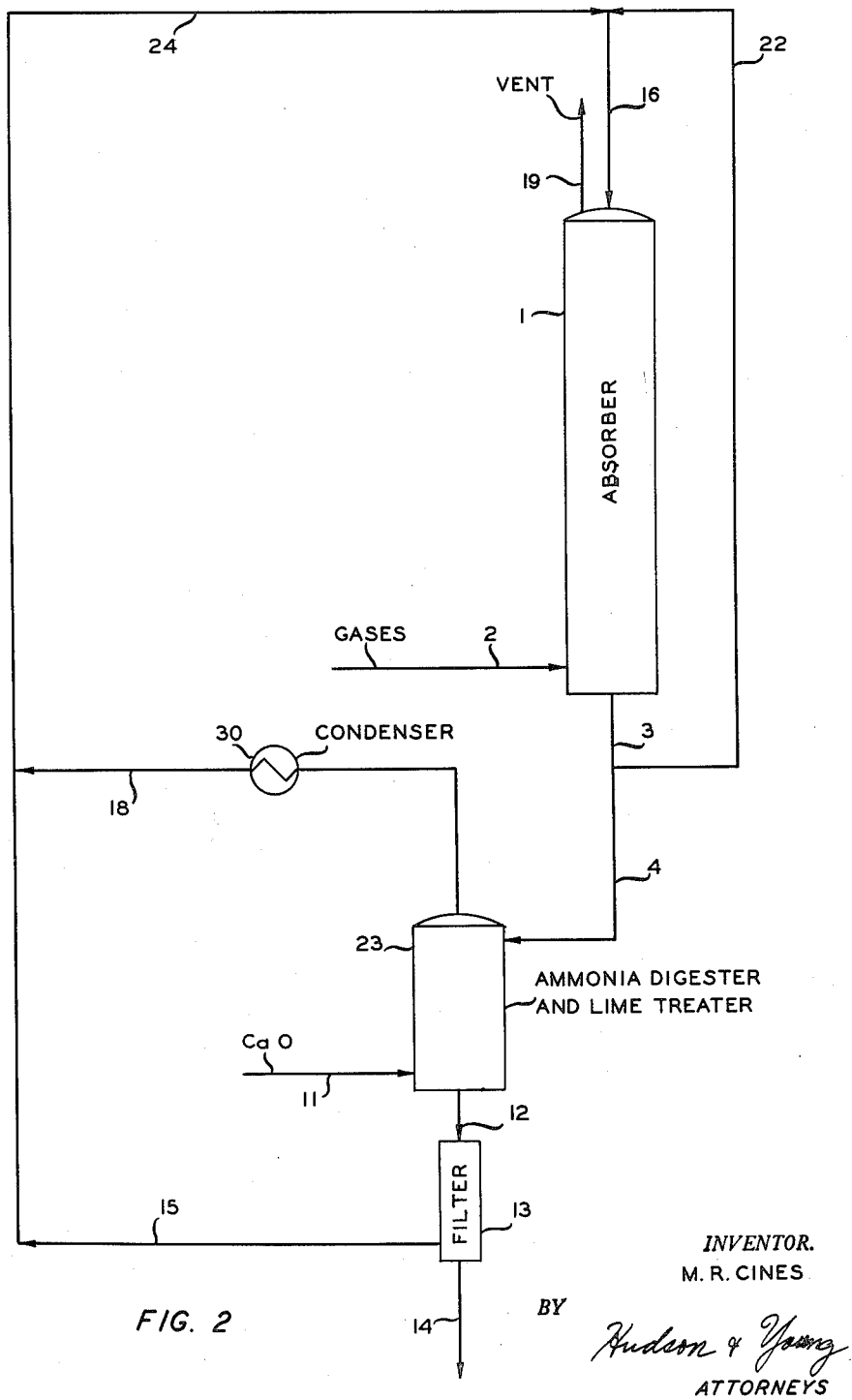

The process of my invention can best be understood by reference to the accompanying drawing of which:

FIGURE 1 is a diagrammatic illustration of an absorber, ammonia digester, lime treater and associated lines, suitable for carrying out the invention in one embodiment, and FIGURE 2 is a diagrammatic illustration of a process flow for carrying out the invention in which digestion and lime treating are accomplished in a single zone.

Referring to FIGURE 1, fumes containing $SiF_4$ and HF, from the acid digestion of phosphate rock, enter absorber 1 by way of line 2 wherein they are countercurrently contacted with and absorbed by an aqueous solution of $NH_4F$ and $(NH_4)_2SiF_6$ entering by way of line 16. Absorber 1 may be a packed tower, packed tray, perforated tray, bubble tray, shower deck, Schneible gas scrubber, or other efficient means for contacting gases and liquids. Liquid is continuously removed from the bottom of absorber 1 by way of line 3 and recycled to the top of absorber 1 by way of lines 22 and 16. A dilute ammonia solution is added to the recycle stream by way of line 24. The absorbed fluorine compounds react with the ammonia solution to form ammonium fluosilicate and ammonium fluoride.

$$3NH_4OH + 3HF + SiF_4 \rightarrow NH_4F + (NH_4)_2SiF_6 + 3H_2O + heat$$

Assuming that the $SiF_4$ has already combined with sufficient HF to form fluosilicic acid ($2HF + SiF_4 \rightarrow H_2SiF_6$) the equation could be written:

$$3NH_4OH + HF + H_2SiF_6 \rightarrow NH_4F + (NH_4)_2SiF_6 + 3H_2O + heat$$

The defluorinated fumes are vented from the top of absorber 1 through line 19 to a stack (not shown). A portion of the fluo-ammonium compounds in line 3 are continuously withdrawn as a side stream through line 4, to which concentrated ammonia is added through line 25 and, if necessary, line 21. Line 4 feeds into ammonia digester 5 wherein the ammonium fluosilicate is decomposed to ammonium fluoride and orthosilicic acid, preferably under elevated temperature, the silicic acid precipitating as a gelatinous floc which settles to the bottom of digester 5.

$$(NH_4)_2SiF_6 + 4NH_4OH \rightarrow 6NH_4F + Si(OH)_4$$

A solution of $NH_4F$ is withdrawn from digester 5 through line 20 which discharges at a point just above the level of the settled floc.

A slurry of orthosilicic acid in ammonium fluoride solution is continuously removed from the bottom of digester 5 by way of line 6 to filter 7 where the silica is removed by filtration, washed, and sent by way of line 8 to disposal. The filtrate, a dilute aqueous ammonia solution of ammonium fluoride, passes from the filter by way of line 9 to line 20. The combined solution of ammonium fluoride in dilute aqueous ammonia passes to lime treater 10 wherein lime, either slaked or unslaked, is introduced through line 11 for the precipitation of the fluoride as calcium fluoride. If the lime is added in unslaked form (calcium oxide) it quickly hydrates in the dilute ammonia solution. Hence in either case the ammonium fluoride is reacted with calcium hydroxide:

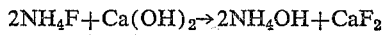

$$2NH_4F + Ca(OH)_2 \rightarrow 2NH_4OH + CaF_2$$

A slurry of calcium fluoride in dilute aqueous ammonia is continuously removed by way of line 12 to filter 13 from which the calcium fluoride is removed as residue by line 14 to disposal. The fumes from lime treater 10 are withdrawn overhead through conduits 17 and 25 and condensed in condenser 30 as a moderately concentrated aqueous ammonia solution and also from filter 13 through conduit 15. The greater portion or all of this solution is returned to line 4 for use in the ammonia digester 5; any portion not thus returned is drawn off at 18 and added to line 24 which carries the dilute recycle ammonia solution from filter 13 back to absorber 1. Make-up ammonia can be added when needed through line 21.

While it might appear that bases other than ammonia could be used in this invention, the fact is that ammonia is unique. It is essential to the process of this invention that the base used in absorber 1 form a product which is soluble pending further treatment, i.e., neither the fluoride nor the fluosilicate should precipitate in the absorber or in the line leading from there to the digester. This requirement eliminates such conventional bases as the sodium and potassium compounds which, although forming soluble fluorides, form insoluble fluosilicates. It likewise eliminates such bases as the calcium compounds which, while forming a partially soluble fluosilicate, form an insoluble fluoride. Others, such as barium, fail in both respects, that is, both barium fluoride and barium fluosilicates are insoluble in water. Only ammonia qualifies on both counts; both the fluoride and the fluosilicate of ammonia are water soluble.

As previously stated, it is within the scope of the invention to carry out ammonia digestion and lime treating in a single zone. FIGURE 2 of the drawings is presented in illustration of this method of operation. Referring to FIGURE 2, fumes containing $SiF_4$ and HF are again absorbed in absorber 1. The absorber bottoms are divided with a portion being returned to the top of the absorber through conduit 22 and the remainder being introduced to ammonia digester and lime treater 23 through conduit 4. In addition to the absorber bottoms, calcium oxide is also introduced to the ammonia digester and lime treater. In this vessel, which is maintained at elevated temperatures, ammonia fluosilicate is partially converted to ammonium fluoride which in turn is converted to calcium fluoride, releasing ammonia, and the remainder of the ammonium fluosilicate is reacted to form calcium fluosilicate. Since calcium fluosilicate is capable of hydrolyzing, for example, by exposure to moisture in the air, it is desirable that an excess of calcium oxide be added to the ammonia digester and lime treater so as to provide an excess of this material in the residue from this vessel, said residue constituting the material which must be disposed of. The fluosilicates and calcium fluoride, which are insoluble, are removed from the bottom of the ammonia digester and lime treater through line 12 and filter 13 wherein the solids are separated, being disposed of through conduit 14. Ammonia released in the ammonia digester and lime treater is withdrawn overhead through condenser 30 and conduit 18 and also from filter 13 through conduit 15, the two streams being combined and returned to the absorber through conduit 24. If desired, ammonia released in the ammonia digester and lime treater can be recycled to this vessel to increase the concentration of ammonia therein.

While certain embodiments of the invention have been set forth above, it is understood that these merely illustrate and do not limit the invention. For example, while the stream of concentrated aqueous ammonia is, in FIGURE 1, admitted to ammonia digester 5 through line 4, it could be admitted through a separate line. And while the specification has spoken of the fluorine disposal problem of this invention as it applies to phosphate fertilizer manufacture, this is not a limiting feature; the method of this invention would be equally applicable to the disposal of fluo acid-containing fumes from any other source, e.g., it could be applied to the defluorination of the vapors of an alkylation process using active fluoride catalyst.

The following examples are presented in illustration of the invention.

*Example I*

| | Weight percent | Lb./min. |
|---|---|---|
| Flows: | | |
| Acidic gases to absorber (2) | | 21 |
| Composition: | | |
| HF | 21.8 | |
| $H_2SiF_6$ | 78.2 | |
| Dilute ammonia to absorber (24) | | 840 |
| Composition: | | |
| $NH_3$ | 0.5 | |
| $H_2O$ | 99.5 | |
| Absorber bottoms (3) | | 8,630 |
| Composition: | | |
| $H_2O$ | 96.6 | |
| $NH_4F$ | 1.0 | |
| $(NH_4)_2SiF_6$ | 2.4 | |
| Absorber recycle (22) | | 7,770 |
| Composition: | | |
| $H_2O$ | 96.6 | |
| $NH_4F$ | 1.0 | |
| $(NH_4)_2SiF_6$ | 2.4 | |
| Feed to ammonia digester (4) | | 1,090 |
| Composition: | | |
| $H_2O$ | 96.45 | |
| $NH_3$ | 0.92 | |
| $NH_4F$ | 0.78 | |
| $(NH_4)_2SiF_6$ | 1.85 | |
| Feed to lime treater (9+20) | | 1,705 |
| Composition: | | |
| $H_2O$ | 97.87 | |
| $NH_3$ | 0.13 | |
| $NH_4F$ | 2.00 | |
| Lime treater overhead (17) | | 230 |
| Composition: | | |
| $H_2O$ | 95.45 | |
| $NH_3$ | 4.55 | |
| $CaF_2$ product (14) | | 195 |
| Composition: | | |
| $H_2O$ | 86.1 | |
| $CaO$ | 0.7 | |
| $CaF_2$ | 13.2 | |

| | °F. |
|---|---|
| Temperatures: | |
| Absorber (1): | |
| Top | 165 |
| Bottom | 170 |
| Ammonia digester (5) | 210 |
| Lime treater (10) | 210 |
| Pressure—atm. in all vessels. | |

Example II

| | Weight percent | Lb./min. |
|---|---|---|
| Flows: | | |
| Acid gases to absorber (2) | | 21 |
| Composition: | | |
| HF | 21.8 | |
| $H_2SiF_6$ | 78.3 | |
| Dilute ammonia to absorber (24) | | 1,390 |
| Composition: | | |
| $NH_3$ | 4.1 | |
| $H_2O$ | 95.9 | |
| Absorber bottoms (3) | | 8,810 |
| Composition: | | |
| $H_2O$ | 94.4 | |
| $NH_3$ | 3.6 | |
| $NH_4F$ | 0.6 | |
| $(NH_4)_2SiF_6$ | 1.4 | |
| Absorber recycle (22) | | 7,400 |
| Composition: | | |
| $H_2O$ | 94.4 | |
| $NH_3$ | 3.6 | |
| $NH_4F$ | 0.6 | |
| $(NH_4)_2SiF_6$ | 1.4 | |
| Feed to ammonia digester (4) and lime treater | | 1,410 |
| Composition: | | |
| $H_2O$ | 94.4 | |
| $NH_3$ | 3.6 | |
| $NH_4F$ | 0.6 | |
| $(NH_4)_2SiF_6$ | 1.4 | |
| Overhead from ammonia digester (18) and lime treater | | 280 |
| Composition: | | |
| $H_2O$ | 79.6 | |
| $NH_3$ | 20.4 | |
| Bottoms from ammonia digester (14) and lime treater | | 210 |
| Composition: | | |
| $H_2O$ | 79.2 | |
| Solids | 20.8 | |
| Solids composition (approx.): | | |
| $CaSiF_6$ | 14.3 | |
| $CaSiO_3$ | 18.6 | |
| $CaF_2$ | 55.9 | |
| $Ca(OH)_2$ | 11.2 | |

| | °F. |
|---|---|
| Temperatures: | |
| Absorber (1): | |
| Top | 80 |
| Bottom | 100 |
| Ammonia digester and lime treater (23): | |
| Overhead | 210 |
| Bottom | 265 |
| Pressure—atmospheric in all vessels. | |

The preceding example illustrates an operation in which ammonia digestion and lime treating are carried out in a single vessel. It is noted that in this method of operation about two-thirds of the ammonium fluosilicate is converted to calcium fluoride, the remainder reacting to form calcium fluosilicate. Subsequent hydrolysis of the calcium fluosilicate is largely prevented by providing an excess of calcium oxide in the solids removed from the ammonia digester.

Example III

| | Weight percent | Lb./min. |
|---|---|---|
| Flows: | | |
| Acidic bases to absorber (2) | | 20.9 |
| Composition: | | |
| HF | 22.1 | |
| $H_2SiF_6$ | 77.9 | |
| Dilute ammonia to absorber (24) | | 895 |
| Composition: | | |
| $NH_3$ | 0.9 | |
| $H_2O$ | 99.1 | |
| Absorber bottoms (3) | | 9,155 |
| Composition: | | |
| $H_2O$ | 93.9 | |
| $NH_3$ | 3.0 | |
| $NH_4F$ | 0.9 | |
| $(NH_4)_2SiF_6$ | 2.2 | |
| Absorber recycle (22) | | 8,240 |
| Composition: | | |
| $H_2O$ | 93.9 | |
| $NH_3$ | 3.0 | |
| $NH_4F$ | 0.9 | |
| $(NH_4)_2SiF_6$ | 2.2 | |
| Feed to ammonia digester (4) | | 1,205 |
| Composition: | | |
| $H_2O$ | 94.6 | |
| $NH_3$ | 3.0 | |
| $NH_4F$ | 0.7 | |
| $(NH_4)_2SiF_6$ | 1.7 | |
| Feed to lime treater (9+20) | | 1,203 |
| Composition: | | |
| $H_2O$ | 94.9 | |
| $NH_3$ | 2.3 | |
| $NH_4F$ | 2.8 | |
| Lime treater overhead (17) | | 264 |
| Composition: | | |
| $H_2O$ | 86.3 | |
| $NH_3$ | 13.7 | |
| $CaF_2$ product (14) | | 42.8 |
| Composition: | | |
| $H_2O$ | 20.2 | |
| $CaO$ | 0.2 | |
| $CaF_2$ | 79.6 | |

| | °F. |
|---|---|
| Temperatures: | |
| Absorber (1): | |
| Top | 80 |
| Bottom | 100 |
| Ammonia digester (5) | 185 |
| Lime treater (10) | 210 |
| Pressure—atmospheric in all vessels. | |

Example III illustrates an operation in which the absorption is carried out with a quantity of ammonia sufficient to provide a basic effluent, namely an effluent containing unreacted ammonia.

Having thus described the invention by providing a specific example thereof, it is to be understood that no undue limitations or restrictions are to be implied by reason thereof and that many variations and modifications are clearly within the scope of the invention.

I claim:

1. A process for efficiently defluorinating fumes containing HF and $SiF_4$ comprising introducing the fumes into the lower portion of an absorption zone, countercurrently scrubbing said fumes therein with a dilute ammoniacal solution containing ammonium fluoride and ammonium fluosilicate and having an ammonia concentration of between about 0.01 and about 5 percent by weight whereby said HF and $SiF_4$ are neutralized to form ammonium fluoride and ammonium fluosilicate, said ammoniacal solution being maintained at an elevated temperature and preventing formation of insoluble orthosilicic acid, continuously withdrawing solution having an ammonia concentration of between about pH 4 and about 0.1 pound of unreacted ammonia per gallon of solution from the base of the absorption zone, recycling a portion thereof to the upper portion of said zone whereby the concentration of water in the withdrawn solution is decreased with respect to the concentration without recycling, passing the remainder of the withdrawn solution to a digestion zone maintained at a temperature of 100 to 212° F., admitting additional ammoniacal solution to said zone and maintaining quiescent conditions therein whereby the ammonium fluosilicate is converted to silica which precipitates and to ammonium fluoride which remains in solution, contacting the solution with calcium hydroxide to precipitate calcium fluoride therefrom with the accompanying release of ammonia and recycling released ammonia to the defluorinating system for reuse.

2. The process of claim 1 wherein ammonia released as a by-product of the calcium fluoride precipitation is recycled for admixture with the scrubber solution.

3. The process of claim 1 wherein the ammonia released as a by-product of the calcium fluoride precipitation is recycled to the ammonia digestion zone.

4. In a process wherein fluorine is expelled in the form of $SiF_4$ and HF gases, the improved method of defluorinating fumes containing these gases comprising absorbing said gases in an ammoniacal solution containing between about 0.01 and 5 percent by weight of ammonia whereby the gases are neutralized to ammonium fluoride and ammonium fluosilicate, said ammoniacal solution being maintained at an elevated temperature and preventing formation of insoluble orthosilicic acid, continuously withdrawing solution having an ammonium concentration of between about neutral and about five percent by weight of unreacted ammonia from the bottom of the absorption zone, recycling a portion thereof to the upper portion of said zone whereby the water concentration of the withdrawn solution is decreased, with respect to the concentration without recycling, passing the remainder of the solution to a digestion and lime treating zone and there treating it with additional ammonia and calcium hydroxide whereby ammonium fluosilicate and ammonium fluoride are converted to a precipitate comprising calcium fluosilicate, calcium silicate, and calcium fluoride, with the accompanying release of ammonia, separating the precipitate and recycling released ammonia to the defluorinating system for reuse.

5. The process of claim 4 wherein ammonia released as a by-product in the digestion and lime treating zone is recycled for admixture with the scrubbing solution.

6. The process of claim 4 wherein ammonia released as a by-product from the ammonia digestion and lime treating zone is recycled to said zone.

References Cited in the file of this patent

UNITED STATES PATENTS

| | | |
|---|---|---|
| 1,235,552 | Chappell | Aug. 7, 1917 |
| 2,141,773 | Strathmeyer | Dec. 27, 1938 |
| 2,371,759 | King et al. | Mar. 20, 1945 |
| 2,780,522 | Gloss et al. | Feb. 5, 1957 |
| 2,780,523 | Gloss et al. | Feb. 5, 1957 |
| 2,780,524 | Gloss et al. | Feb. 5, 1957 |
| 2,816,818 | Gross | Dec. 17, 1957 |